US006905770B2

United States Patent
Kaliser et al.

(10) Patent No.: US 6,905,770 B2
(45) Date of Patent: Jun. 14, 2005

(54) FADE PROTECTOR

(75) Inventors: David Newton Kaliser, Oak Ridge, NC (US); William Dean Jarrett, Martinsville, VA (US); Philip J Solomon, Martinsville, VA (US); Steven A Barth, Martinsville, VA (US); Mary Elizabeth Lawless, Stuart, VA (US); James P Enniss, Martinsville, VA (US)

(73) Assignee: CPFILMS, Inc, Fieldale, VA (US)

( * ) Notice: Subject to any disclaimer, the term of this patent is extended or adjusted under 35 U.S.C. 154(b) by 0 days.

(21) Appl. No.: 10/389,083

(22) Filed: Mar. 15, 2003

(65) Prior Publication Data

US 2004/0180215 A1 Sep. 16, 2004

(51) Int. Cl.[7] .................................................. B32B 9/00
(52) U.S. Cl. ..................... 428/430; 428/423.1; 428/480; 428/482; 40/700; 40/707; 40/772
(58) Field of Search .................................. 428/482, 480, 428/430, 423.1; 40/700, 707, 772

(56) References Cited

U.S. PATENT DOCUMENTS 5,413,840 A * 5/1995 Mizuno .................... 428/195.1
5,787,625 A * 8/1998 Yesbick ....................... 40/718
6,650,478 B1 * 11/2003 DeBusk et al. ............. 359/585

* cited by examiner

*Primary Examiner*—Deborah Jones
*Assistant Examiner*—G. Blackwell-Rudasill
(74) *Attorney, Agent, or Firm*—Paul E Milliken; Ray L Weber

(57) ABSTRACT

A method of protecting a glazed frame mounted document from the ravages of light and a fade protector therefore, the protector comprising a transparent UV absorbing polymeric film layer, preferably PET, having a thickness such that the film in use remains substantially flat against the glazing when clamped between the frame and glazing, the film layer being coated on its exposed side in use with a transparent anti-glare hard coating. The glazing is removed from the glazed frame, the fade protector is placed against a surface of the glazing which is then re-assembled in the frame with the fade protector adjacent the eternal surface of the glazing with the anti-glare coating facing outwardly.

10 Claims, 1 Drawing Sheet

FADE PROTECTOR

FIELD

This invention relates to a fade protector which is for use in a glazed frame to protect documents of pictures displayed in the frame from fading caused by exposure to light, and to an anti-glare coating which is particularly useful for a fade protector.

BACKGROUND OF THE INVENTION

The protection of framed documents or pictures from the ravages of light typically involves the use of conservation glass which is expensive. More recently the present assignee has introduced a Do-it-yourself (DIY) framing film that blocks out harmful UV radiation. Such films reduce fading and control glare when applied to the glass in picture frames. The film comprise a UV absorbing PET (polyethylene terephthalate) layer about 4 mil (0.1 mm) thick having an antiglare hard coat on one side and a low tack adhesive covered with a release liner on the other side. The glass is removed from the frame and the front of the glass is sprayed with water, the release liner is removed from the film, and the adhesive layer is also sprayed with water and the wet film is applied to the glass. The water is squeezed away by means of a sponge or paper towel wiped gently over the film and the whole dried.

The above system while providing an inexpensive protection from light for the DIY framing market is inconvenient to apply and the present invention seeks to provide a film that is more convenient to apply.

STATEMENTS OF INVENTION

According to the present invention there is provided a fade protector for incorporation into a glazed frame, the protector comprising a transparent UV absorbing polymeric film layer having a thickness such that the film in use remains substantially flat against the glazing when clamped between the frame and glaring, the film layer being coated on one side with a transparent anti-glare hard coating.

The polymeric film may comprise one of polycarbonate, acrylic, polypropylene and PET, the preferred film being PET.

Glazing includes any suitable transparent sheet material for insertion into a surrounding frame for covering a document, picture etc. and examples of which include glass, acrylic sheet polyester sheet, polycarbonate sheet.

The UV absorbing PET film is as disclosed in U.S. Pat. No. 6,221,112 and blocks up to 99% of UV-A (320–400 nm) and UV-B (280–320 nm) rays.

The thickness of the PET film increase with the size of the frame. The thickness T of the film is related to the diagonal dimension D of the frame such that D/T lies between $2\pm1\times10^3$ so that for example:

a) frames<4"×6" (100 mm×150 mm)use 4 mil thick film (0.10 mm)

b) frames from 5"×7" (125 mm×175 mm) to 11"×14" (225 mm×350 mm) use 7 mil (0.175 mm) thick film, and c) frames>11"×14" use 10 mil (0.25 mm) thick film for example 16"×20"

The anti glare hard coating is preferably a UV cured acrylate resin coating having a nanoparticle dispersion therein which has a 60 degree gloss of 80–100 gloss units and preferably 85–95 gloss units, a haze of less than 12% and preferably 9–11% and scratch resistance to 0000 steel wool. The anti glare coating has a surface structure that scatters light so as to reduce unwanted reflection but the bulk of the coating is clear with low or no haze so that the image of the picture or document does not suffer from excessive "greying out" or loss of contrast. The coating is about 4 microns in thickness.

The other surface of the polymeric film (away from the anti-glare hard coat) may be masked by a release liner which protects the film against scratching or marking prior to use and is also low tack and easily peelable from the film. If the removal of the film causes a build up in static electricity on the film which attracts dirt, dust etc. then the tacky liner may be used as a cleaner to remove the dirt particles from the newly exposed sure on the film and/or the glazing surface. The release liner preferably comprises a polyethylene coated paper.

According to another aspect of the invention there is provided a glazed frame for mounting a picture, document etc and which comprises a frame, a sheet of glazing mounted in the frame, a backing board holding the glass and picture in the frame, and a fade protector clamped between a portion of the frame and the exposed surface of the glass, the fade protector comprising a transparent UV absorbing polymeric film layer having a thickness such that the protector in use remains substantially flat against the glazing when clamped between the frame and glazing.

The frame may be provided with a resilient foam layer for biasing the glaring towards the protector.

Another aspect of the invention provides a method of protecting a glazed frame mounted document from the ravages of light using a fade protector comprising a transparent UV absorbing polymeric film layer having a thickness such that the film in use remains substantially flat against the glazing when clamped between a portion of the frame and glazing, the film layer being coated on its exposed side in use with a transparent anti-glare hard coating wherein in said method the glazing is removed from the glazed frame, the fade protector is placed against a surface of the glazing which is then re-assembled in the frame with the fade protector clamped adjacent the external surface of the glazing with the anti-glare coating facing outwardly.

Yet still another invention provides a method of protecting a glazed frame mounted document from the ravages of light using a fade protector comprising a transparent UV absorbing polymeric film layer having a thickness such that the film in use remains substantially flat against the glazing when clamped between the frame and glazing the polymeric film being coated on its exposed side in use with a transparent anti-glare hard coating and its other side is masked by a release liner which is low tack and easily peelable from the film, wherein in said method the glazing is removed from the glazed frame, the mask is removed from the film and its tacky surface is used to clean the surface(s) of either the glazing or film, the glaring then being re-assembled in the frame with the fade protector clamped adjacent the external surface of the glazing with the anti-glare coating facing outwardly.

According to another aspect of the preset invention there is provide a light curable anti glare coating composition for coating onto a transparent substrate comprising a dispersion of nanoparticles of a mineral oxide suspended in a mixture of at least one acrylate—functional resin that provides the desired coating hardness and that may or may not be compatible with the nanoparticle dispersion (compatible here means that the resin or other components can be added to the dispersion or vice versa without causing the nanoparticles to aggregate or flocculate), at least one compatible solvent, at least one incompatible solvent that has a lower volatility than the compatible solvent, and a surfactant that has poor or limited compatibility with the dispersion. Where an incompatible acrylate—functional resin is a sufficiently high proportion of compatible solvents must be used to maintain the stability of the dispersion.

The mineral oxide is preferably a silica that has a polar surface and which is compatible with polar solvents such as alcohols eg IPA and acids eg acrylic acid, and incompatible with non-polar aromatic solvents such as toluene and xylene, and not very compatible with fluorinated surfactants.

By suitable choice of compatible and incompatible solvents and their relative volatility and suitable method of preparation it is possible to prepare coatings that are stable solutions/dispersions prior to application but that undergo a limited and controlled destabilization of the nanoparticle dispersion at the surface of the coating together with a concentrating of the surfactant during oven drying and/or UV coating such that a structure and roughness is produced in the surface region of the coating that scatters light whilst the bulk of the coating forms a film in which the dispersion remains stable and so remains clear, transparent and with low or no haze. This scattering results in lower specular reflection and higher diffuse reflection and so reduces measured gloss and reduces unwanted glare and reflection. The structure also scatters light in transmission and so measured haze is lower than for a film without the surface structure because the scattering effect is confined to the surface the net haze increase is less than for a conventional anti-glare coating in which the particles are dispersed evenly throughout the coating.

An anti-glare coating according to the present invention may be tailored to achieve varying levels of gloss and haze by concentration of nanoparticles and by choice of resins, solvents, and surfactant in such a way that the roughness and thickness of the surface layer changes but the haze and scatter still remain a surge effect.

Yet another aspect of the present invention provides a transparent composite having a transparent substrate coated with an anti-glare layer comprising a dispersion of nanoparticles in a cured acrylate-based resin, the coating a having a desired haze value and a desired 60 degree gloss value such that:

Gloss $\approx 113-(2.32 \times Haze)$ where the gloss value lies between 20–90 gloss units Preferably the haze <12% and the Gloss value lies between 85–95 gloss unit It would be possible to use nanoparticles that have been surface treated so that the particles are compatible with non polar solvents and incompatible with polar solvents. Again by suitable choice of resins that are compatible with the nanoparticle dispersions (and surfactants that are not very compatible with the dispersion) and by choice of solvents and their volatility such that the incompatible solvent(s) were less volatile than the compatible solvents, it would be possible to generate similar films with surface structures that scatter light.

Other suitable nanoparticles are described in U.S. Pat. No. 6,440,551 may also be used.

Also according to yet another the invention there is provided a polymeric film coated with the anti-glare coating according as is disclosed herein.

DESCRIPTION OF THE DRAWINGS

The invention will be described by way of example And with reference to the accompanying drawings in which.

DETAILED DESCRIPTION OF THE INVENTION

Figure 1:
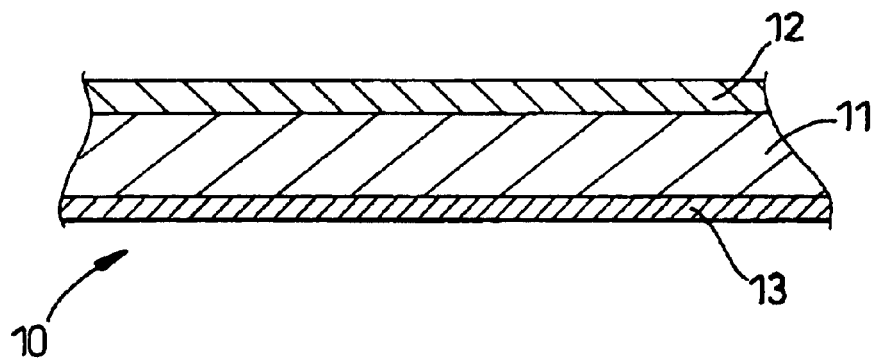
FIG. 1 is a cross-section through a UV protector according to the present invention.

With reference to FIG. 1 there is shown a fade protector 10 comprising a suitable transparent polymeric film layer 11 including a UV absorber. A suitable transparent film is a polyester film, preferably a polyethyleneterephthalate (PET) film treated with a UV absorber as described in U.S. Pat. No. 6,221,112B so as to absorb up to 99% of UV radiation. A suitable PET film is DuPont Teijin Films'Melinex 454 or LJX 112. The PET films layer 11 is provided with an anti glare coating 12 on one side thereof and with a paper based mask 13 on the other side thereof.

The mask 13 is preferably release liner having a low tack adhesive on one side which in use adheres to the back surface of the PET layer to protect the film from scratching or marking prior to use. A suitable release liner is a polyethylene coated paper with a low tack adhesive thereon and a suitable product is available from Felix Schoeller Inc. of Pulaski, N.Y. under the designation 861b HDPE release liner.

The anti-glare coating may also serve as a hard coat or scratch resistant layer and comprises a dispersions of nanoparticles in a UV cured polymeric resin coating having a thickness of about 4 microns and having the following typical physical properties:

Haze <12% more preferably 9–11%

Gloss 60 degree gloss 80–100 gloss units, more preferably 85–95 gloss units

Scratch resistant to 0000 Steel Wool

The Gloss was measured using a Byk Gardner Glossmeter

The haze was measured using a Hunter Laboratories Ultrascan XE and calculated according to (Diffuse Transmittance/Total Transmittance)×100 over a light range of 380–780 nm.

The abrasion test is a subjective test in which the coating is rubbed with steel wool and viewed for haze.

Figure 2:
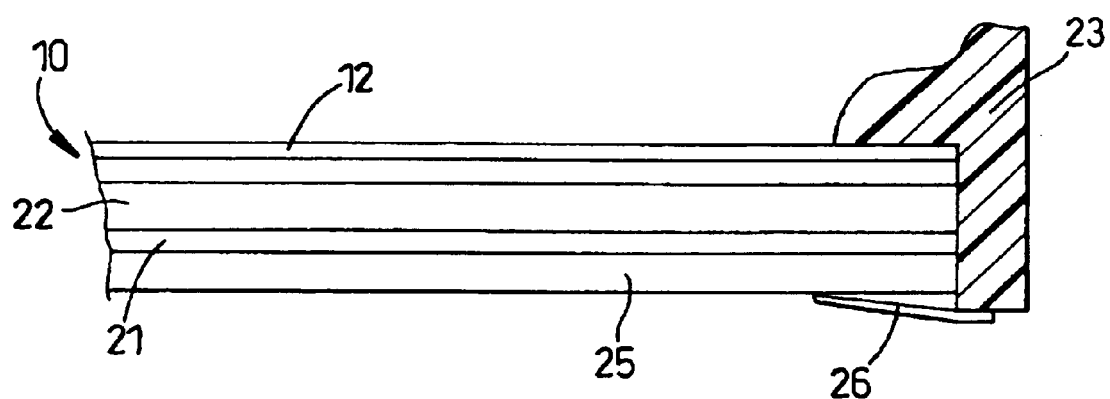
FIG. 2 is a cross-section through a picture frame showing the UV protector in use

With reference to FIG. 2. there is shown a glazed frame 23 for mounting a picture 21, document, photograph etc. which requires protection from light. The glazing 22 which covers the picture 21 within the frame in this example is a sheet of glass and has a fade protector 10 placed over the glass. The fade protector 10 is clamped between the edge of the frame and the glass 22 and is held in location by a back board 25. The thickness of the PET should be sufficient to hold the PET film against the glass across substantially the whole area of the film.

The thickness of the PET layer 11 will vary according to the size of the frame 23. The PET film is produced in standard thicknesses of 4, 7 & 10 mil (100, 175, 250 microns) and the thickness T of the film used is a compromise of what would be an ideal thickness for a particular diagonal dimension D of a frame and what standard materials are available. The film thickness is given by the formula D/T lies in range $2\pm 1\times 10^3$ For example for standard frame sizes of:

a) frames<4"×6" (100 mm×150 mm) use 4 mil thick film (0.10 mm)

b) frames from 5"×7" (125 mm×175 mm) to 11"×14" (225 mm×350 mm) use 7 mil (0.175 mm) thick film, and c) frames>11"×14" use 10 mil (0.25 mm) thick film for example 16"×20"

The fade protector 10 is placed over the glaring 22 with the anti-glare coating 12 facing outwards. The fade protector as well as protecting the picture 21 from UV radiation will physically protect the glazing and (if the glazing is glass) should the glass crack or shatter will help hold the glass safely in the frame until a repair can be carried out.

A glazed frame 23 is dismantled to remove the glass prior to the application of the fade protector 10. The release liner 13 is removed from the PET layer 11. If the PET liner has built up a static charge and attracts dirt the tacky side of the release liner 13 may then be used to remove dirt, particles etc from either or both the PET and the glass surface before assembly. The fade protector is then laid over the glass and the glass reassembled in the frame. The picture is then held in place by a backing board 25 and clips 26.

A thin layer of resilient foam material may be placed at the back of the frame to bias the glass towards the fade protector.

The anti glare coating is formed from a UV cured acrylate based resin which contains a dispersion of nanoparticles of a mineral oxide, for a transparent and colourless coating silica is preferred but other metal oxides may be used for tinted coatings (see for example the use of metal oxides disclosed in the applicants U.S. Pat. No. 6,440,551). The particle size should be less than 0.1 microns.

The coating is formed from a liquid composition which is applied to the surface of the PET film by a reverse gravure process. The coating composition comprises:

| | |
|---|---|
| Silica | 15–22% |
| Acrylate resin | 43–57% |
| Compatible solvent | 16–24% |
| Incompatible Sovent | 6–12% |
| Photointiator | 2.4–2.8% |
| Surfactant | 0.05–0.2% |

The percentages are weight percentages of the coating mixture.

A suitable silica dispersion is Highlink 502–31 available from Clariant The acrylate resin is preferably a mixture of 0–7% hexanedioldiacrylate and 40–50% of a penta aerythritol tetraacrylate and tricrylate mixture. The percentages are based on the total composition. Suitable materials are respectively Sartomer SR-238 and Sartomer SR-295 available from Sartomer (Total).

The compatible solvents are preferably isopropyl alcohol and/or acrylic acid in the ratios 0:1 to 1:0.

The incompatible solvents are less volatile than the compatible solvents and preferably comprise Xylene and/or Toluene in the ratios 0:1 to 1:0.

A suitable surfactant is Fluorad FC 430 available from 3M Corporation.

The ingredients for the coating are mixed together with the incompatible solvents being added next to last to the mix with the surfactant being added last. The incompatible solvents and surfactant are added last so that the polar dispersion is not thrown out of the suspension. The final composition is mixed for about 5 minutes and is then stable for storage and use.

The clear stable coating composition coats evenly and levels smoothly having no large particles in suspension which may cause streaks and haze bands. After application to the PET film the coating remains stable until the drying and curing stages.

As the coating dries and then cures under UV light, the compatible solvents being more volatile migrate to the surface and evaporate faster than the less volatile non-polar solvents. The incompatible surfactant also migrates to the surface. The action of these migrations causes some of the dispersion to migrate to the surface layer of the coating hence the top surface of the coating becomes increasingly rich in incompatible components and in concentration of nanoparticles. The high concentration of nanoparticles in the midst of incompatible solvent and incompatible surfactant causes the nanoparticles to agglomerate and flocculate together at the surface layer of the coating. The surface layer becomes structured and rough on a scale that scatters visible light. The structure at the air/coating interface at the surface of the coating causes scattering of light but the particles remaining in the bulk of the coating remain stably dispersed and do not scatter light. The surface scatters reflected light and reduces gloss, apparent reflection and bright glare.

The final cured coating thickness is about 4 microns.

What is claimed is:

1. A fade protector for incorporation into a glazed frame, the protector comprising a transparent UV absorbing polymeric film layer having a thickness such that the film in use remains substantially flat against the glazing when clamped between the frame and glazing, the film layer being coated on its exposed side in use with a transparent anti-glare hard coating and wherein the thickness of the film increases with the size of the frame with the thickness T of the film being related to the diagonal dimension D of the frame such that D/T lies between $2 \pm 1 \times 10^3$.

2. A fade protector for incorporation into a glazed frame, the protector comprising a transparent UV absorbing polymeric film layer having a thickness such that the film in use remains substantially flat against the glazing when clamped between the frame and glazing, the film layer being coated on its exposed side in use with a transparent anti-glare hard coating, wherein the anti-glare hard coating is a UV cured acrylate resin coating having a nanoparticle dispersion therein which is structured in the surface region so as to scatter light and is clear and with low haze in the bulk of the coating.

3. A fade protector as claimed in claim 2 in which the anti-glare coating has a 60 degree gloss of 80–100 gloss units and a haze of <12% and scratch resistant to 0000 steel Wool.

4. A fade protector as claimed in claim 3, wherein the 60 degree gloss is preferably between 85–95 gloss units and the haze is between 9–11%.

5. A fade protector as claimed in claim 2, wherein the polymeric film layer is PET.

6. A fade protector as claimed in claim 2, wherein the other surface of the film is masked by a release liner which is low tack and easily peelable from the film.

7. A glazed frame for mounting a picture, document etc and which comprises a frame, glazing mounted in the frame, a backing board holding the glazing and picture in the frame, and a fade protector clamped between a portion of the frame and a front exposed surface or the glazing, the fade protector comprising a transparent UV absorbing polymeric film layer having a thickness such that the protector in use remains substantially flat against the glazing when clamped between a portion of the frame end the glazing, the film layer being coated on its exposed side with a transparent anti-glare hard coating, wherein the anti-glare hard coating is a UV cured acrylate resin coating having a nanoparticle dispersion therein which is structured in the surface region so as to scatter light and is clear and with low haze in the bulk of the coating.

8. A glazed frame as claimed in claim 7, wherein which the anti-glare coating has a 60 degree gloss of 80–100 gloss units and a haze of <12% and scratch resistant to 0000 steel Wool.

9. A glazed frame as claimed in claim as claimed in claim 7, wherein polymeric film layer is PET.

10. A glazed frame as claimed in claim 7 wherein the thickness of the film increases with the size of the frame with the thickness T of the film being related to the diagonal dimension D of the frame such that D/T lies between $2\pm1\times10^3$.

* * * * *